(12) United States Patent
Kadoi et al.

(10) Patent No.: US 6,495,639 B1
(45) Date of Patent: Dec. 17, 2002

(54) SOLID CATALYST COMPONENT FOR OLEFIN POLYMERIZATION, CATALYST FOR OLEFIN POLYMERIZATION, AND METHOD FOR PRODUCING OLEFIN POLYMERS

(75) Inventors: Yasunori Kadoi, Ichihara (JP); Tsuyoshi Ota, Ichihara (JP); Toshio Isozaki, Ichihara (JP); Kiyokazu Katayama, Ichihara (JP); Takanori Sadashima, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 225 days.

(21) Appl. No.: 09/665,051

(22) Filed: Sep. 19, 2000

Related U.S. Application Data

(62) Division of application No. 09/200,851, filed on Nov. 30, 1998, now Pat. No. 6,204,215.

(30) Foreign Application Priority Data

Jan. 9, 1998 (JP) .......................................... 10-003413

(51) Int. Cl.$^7$ ............................. C08F 210/00; C08F 4/44
(52) U.S. Cl. .................. 526/124.3; 526/348; 526/127; 526/128; 526/158; 526/216; 502/103; 502/127
(58) Field of Search ................................ 526/348, 127, 526/124.3, 128, 158; 502/103, 127

(56) References Cited

FOREIGN PATENT DOCUMENTS

EP    0 125 911  * 5/1984  ................. 502/103
WO    WO 98/56833    12/1998

* cited by examiner

*Primary Examiner*—David W. Wu
*Assistant Examiner*—Ling-Siu Choi
(74) *Attorney, Agent, or Firm*—Oblon, Spivak, McClelland, Maier & Neustadt, P.C.

(57) ABSTRACT

Provided are a solid catalyst component for olefin polymerization and a catalyst comprising the component for olefin polymerization, in which the electron donor is free from the problem of lacking in safety and sanitation, and is inexpensive and easy to produce, and which exhibit high activity in producing olefin polymers with high stereospecificity, and also a method for producing olefin polymers in the presence of the catalyst. The solid catalyst component comprises titanium, magnesium and an electron donor compound of formula (I):

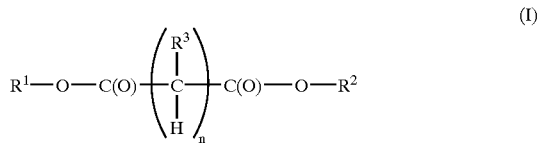

(I)

wherein $R^1$ and $R^2$ each represent a linear or branched hydrocarbon residue having from 1 to 20 carbon atoms; $R^3$ represents an alicyclic hydrocarbon residue having from 3 to 20 carbon atoms; and n represents an integer of from 1 to 10. The solid catalyst component is combined with an organic aluminium compound to prepare a catalyst, which is used in producing olefin polymers.

3 Claims, 1 Drawing Sheet

(A) Solid Catalyst Component
    (a) <Ti Compound>
    (b) Mg Compound
    (c) Electron Donor

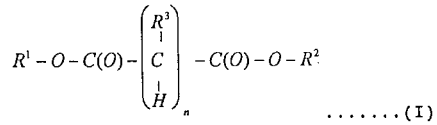

........(I)

wherein $R^1$ and $R^2$ each represent a linear or branched hydrocarbon residue having from 1 to 20 carbon atoms; $R^3$ represents an alicyclic hydrocarbon residue having from 3 to 20 carbon atoms; and n represents an integer of from 1 to 10.

(d) Silicon Compound
(B) Organic Aluminium Compound
    (Organic Al)
(C) Third Component
    (Electron Donor Compound)

→ Olefin

Fig. 1

- (A) Solid Catalyst Component
  - (a) <Ti Compound>
  - (b) Mg Compound
  - (c) Electron Donor

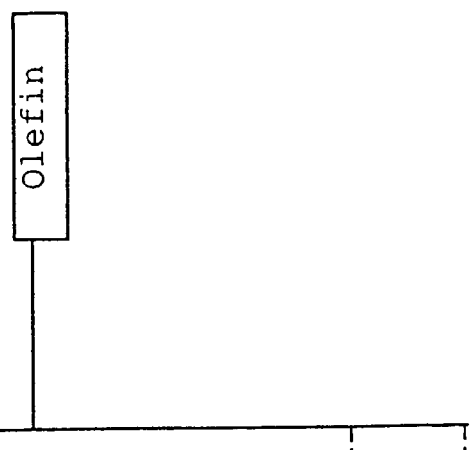

......(I)

wherein $R^1$ and $R^2$ each represent a linear or branched hydrocarbon residue having from 1 to 20 carbon atoms; $R^3$ represents an alicyclic hydrocarbon residue having from 3 to 20 carbon atoms; and n represents an integer of from 1 to 10.
  - (d) Silicon Compound
- (B) Organic Aluminium Compound
  - (Organic Al)
- (C) Third Component
  - (Electron Donor Compound)

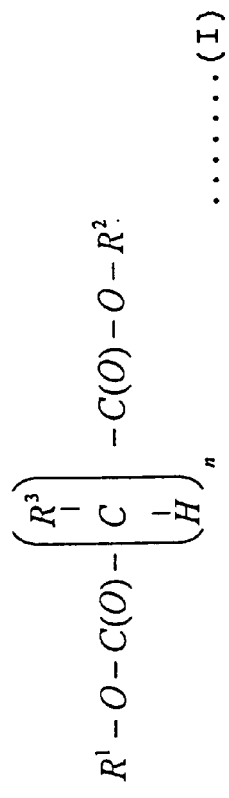

Olefin

SOLID CATALYST COMPONENT FOR OLEFIN POLYMERIZATION, CATALYST FOR OLEFIN POLYMERIZATION, AND METHOD FOR PRODUCING OLEFIN POLYMERS

This application is a Division of application Ser. No. 09/200,851 Filed on Nov. 30, 1998, now U.S. Pat. No. 6,204,215.

FIELD OF THE INVENTION

The present invention relates to a solid catalyst component for olefin polymerization and a catalyst comprising the component for olefin polymerization, which are used in homo- or co-polymerization of α-olefins to give homopolymers or copolymers, and to a method for producing olefin polymers.

BACKGROUND OF THE INVENTION

A variety of solid catalyst components comprising, as the indispensable ingredients, magnesium, titanium, halogen and electron donor have heretofore been proposed for catalysts. It is well known that the catalysts comprising the component of that type have high catalytic activity in olefin polymerization and that α-olefin polymers produced in the presence of the catalyst have high stereospecificity. In particular, it is known that the solid catalyst components comprising, as the electron donor, an aromatic ester such as typically a phthalate exhibit excellent capabilities. However, using aromatic compounds is often disliked as being not safe and not good for the health.

Regarding non-aromatic electron donors, a method of using an electron donor of a malonate derivative has been reported. For example, in Japanese Patent Publication (JP-B) Hei-4-80044, proposed were compounds of a general formula (II):

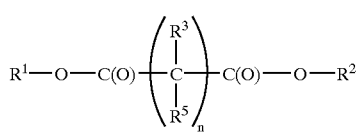

(II)

wherein either one or both of $R^4$ and $R^5$ are linear or branched hydrocarbon residues having 4 carbon atoms, or aromatic hydrocarbon residues. However, the stereospecificity of the polymers to be produced in the method in which the proposed compound is used is not good. In Japanese Patent Application Laid-Open (JP-A) Hei-6-122716, proposed are compounds of formula (II) in which $R^4$ and $R^5$ are bonded to each other to form a ring. In JP-A Hei-279517, proposed were compounds of formula (II) in which $R^4$ and $R^5$ are both hydrogens, those in which either one of $R^4$ and $R^5$ is a linear or branched hydrocarbon residue having 1 or more carbon atoms or an aromatic hydrocarbon residue, and the other is a hydrogen atom, and those in which $R^4$ and $R^5$ are both linear hydrocarbon residues having 2 or more carbon atoms. In the method in which the proposed compound is used, however, the yield of the polymers produced is extremely low. In JP-A Hei-8-157521, proposed were compounds of formula (II) in which $R^4$ and $R^5$ are both branched or cyclic hydrocarbon residues having 3 or more carbon atoms. In the method, however, the proposed malonates having branched or cyclic hydrocarbon residues are difficult to produce, and the yield of the polymers produced is low. Therefore, the method is not practicable. Other methods of using electron donors of other non-aromatic diesters were reported in JP-A Hei-3-124705 and JP-A Hei-3-168208. However, these methods are not always satisfactory for obtaining stereospecific polymers at high yields.

SUMMARY OF THE INVENTION

The object of the present invention is to provide a solid catalyst component for olefin polymerization and a catalyst comprising the component for olefin polymerization, in which the electron donor is free from the problem of lacking in safety and sanitation, and is inexpensive and easy to produce, and which exhibit high activity in producing olefin polymers with high stereospecificity, and also to provide a method for producing olefin polymers.

We, the present inventors have assiduously studied in order to attain the object noted above, and, as a result, have found that the problems mentioned above can be solved by the use of a solid catalyst component for olefin polymerization which comprises titanium, magnesium and an electron donor of a compound of the following general formula (I). On the basis of this finding, we have completed the invention.

Specifically, the invention provides a solid catalyst component for olefin polymerization, a catalyst for olefin polymerization, and a method for producing olefin polymers, which are as follows:

(1) A solid catalyst component for olefin polymerization, which comprises titanium, magnesium and a compound of a general formula (I):

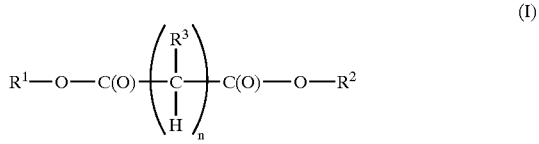

(I)

wherein $R^1$ and $R^2$ each represent a linear or branched hydrocarbon residue having from 1 to 20 carbon atoms, and these may be the same or different ones; $R^3$ represents an alicyclic hydrocarbon residue having from 3 to 20 carbon atoms; and n represents an integer of from 1 to 10.

(2) A catalyst for olefin polymerization, which comprises (A) a solid catalyst component for olefin polymerization of (1), and (B) an organic aluminium compound.

(3) A catalyst for olefin polymerization, which comprises (A) a solid catalyst component for olefin polymerization of (1), (B) an organic aluminium compound, and (C) a third component of an electron donor compound.

(4) The catalyst for olefin polymerization of (3), wherein the third component of an electron donor compound (C) is an organic silicon compound.

(5) A method for producing olefin polymers, which comprises polymerizing olefins in the presence of a catalyst for olefin polymerization of any one of (2) to (4).

BRIEF DESCRIPTION OF THE DRAWING

FIG. 1 a flowchart showing one embodiment of olefin polymerization of the invention.

DETAILED DESCRIPTION OF THE INVENTION

The solid catalyst component for olefin polymerization of the invention is characterized by containing titanium, magnesium, and an electron donor compound of the following general formula (I):

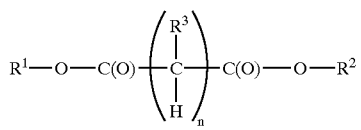

wherein $R^1$ and $R^2$ each represent a linear or branched hydrocarbon residue having from 1 to 20 carbon atoms, and these may be the same or different ones; $R^3$ represents an alicyclic hydrocarbon residue having from 3 to 20 carbon atoms; and n represents an integer of from 1 to 10.

The catalyst for olefin polymerization of the invention is characterized by containing (A) the solid catalyst component for olefin polymerization noted above, (B) an organic aluminium compound, and optionally (C) a third component of an electron donor compound. The method for producing olefin polymers of the invention is characterized by polymerizing olefins in the presence of the catalyst for olefin polymerization noted above.

The catalyst components, the methods for producing them, and the polymerization method are described below.

[I] Catalyst Components (A) Solid Catalyst Component for Olefin Polymerization:

The solid catalyst component for olefin polymerization of the invention comprises titanium, magnesium and an electron donor, and is produced from (a) a titanium compound, (b) a magnesium compound and (c) an electron donor to be mentioned hereinunder.

(a) Titanium Compound:

The titanium compound may be represented by a general formula (III):

$$TiX^1{}_p(OR^6)_{4-p} \qquad (III)$$

In formula (III), $X^1$ represents a halogen atom, and is preferably a chlorine atom or a bromine atom, more preferably a chlorine atom. $R^6$ represents a hydrocarbon residue, which may be saturated or unsaturated, and may be linear, branched or cyclic. This may have hetero atoms such as sulfur, nitrogen, oxygen, silicon, phosphorus and the like. Preferably, however, $R^6$ is a hydrocarbon residue having from 1 to 10 carbon atoms, more preferably an alkyl, alkenyl, cycloalkenyl, aryl or aralkyl group, even more preferably a linear or branched alkyl group. A plurality of $(OR^6)$'s, if any, may be the same or different ones. Specific examples of $R^6$ include a methyl group, an ethyl group, an n-propyl group, an isopropyl group, an n-butyl group, a sec-butyl group, an isobutyl group, a pentyl group, a hexyl group, a heptyl group, an octyl group, a decyl group, an allyl group, a butenyl group, a cyclopentyl group, a cyclohexyl group, a cyclohexenyl group, a phenyl group, a tolyl group, a benzyl group, a phenethyl group, etc. p represents an integer of from 0 to 4.

Specific examples of the titanium compound of formula (III) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium trihalides such as methoxytitanium trichloride, ethoxytitanium trichloride, propoxytitanium trichloride, n-butoxytitanium trichloride, ethoxytitanium tribromide, etc.; dialkoxytitanium. dihalides such as dimethoxytitanium dichloride, diethoxytitanium dichloride, diisopropoxytitanium dichloride, di-n-propoxytitanium dichloride, diethoxytitanium dibromide, etc.; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds, and especially preferred is titanium tetrachloride. These titanium compounds may be used either singly or as combined.

(b) Magnesium Compound:

The magnesium compound for use in the invention may be represented by a general formula (IV):

$$MgR^7R^8 \qquad (IV)$$

In formula (IV), $R^7$ and $R^8$ each represent a hydrocarbon residue, a group of $OR^9$ (where $R^9$ represents a hydrocarbon residue), or a halogen atom. More precisely, the hydrocarbon residue includes, for example, $C_{1-12}$ alkyl, cycloalkyl, aryl and aralkyl groups. In the group $OR^9$, $R^9$ includes, for example, $C_{1-12}$ alkyl, cycloalkyl, aryl and aralkyl groups. The halogen atom includes, for example, chlorine, bromine, iodine and fluorine atoms. $R^7$ and $R^8$ may be the same or different ones. Specific examples of the magnesium compound of formula (IV) include alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium, dicyclohexylmagnesium, etc.; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium, dicyclohexyloxymagnesium, etc.; alkylmagnesium halides and arylmagnesium halides such as ethylmagnesium chloride, butylmagnesium chloride, hexylmagnesium chloride, isoprapylmagnesium chloride, isobutylmagnesium chloride, t-butylmagnesium chloride, phenylmagnesium bromide, benzylmagnesium chloride, ethylmagnesium bromide, butylmagnesium bromide, phenylmagnesium chloride, butylmagnesium iodide, etc.; alkoxymagnesium halides and aryloxymagnesium halides such as butoxymagneium chloride, cyclohexyloxymagnesium chloride, phenoxymagnesium chloride, ethoxymagnesium bromide, butoxymagnesium bromide, ethoxymagnesium iodide, etc.; magnesium halides such as magnesium chloride, magnesium bromide, magnesium iodide, etc.

Of those magnesium compounds, preferably used are magnesium halides, alkoxymagnesiums, alkylmagnesiums and alkylmagnesium halides.

The magnesium compounds noted above may be prepared from metal magnesium or magnesium-containing compounds.

One example of producing the magnesium compounds comprises contacting a metal magnesium with a halide and an alkoxy-having compound of a general formula, $X^2{}_mM(OR^{10})_{n-m}$ (where $X^2$ represents a hydrogen atom, a halogen atom, or a hydrocarbon residue having from 1 to 20 carbon atoms; M represents a boron, carbon, aluminium, silicon or phosphorus atom; $R^{10}$ represents a hydrocarbon residue having from 1 to 20 carbon atoms; n represents the valency of M; and $n > m \geq 0$).

The halide includes, for example, silicon tetrachloride, silicon tetrabromide, tin tetrachloride, tin tetrabromide, hydrogen chloride, etc. Of those, preferred is silicon tetrachloride. The hydrocarbon residue for $X^2$ and $R^{10}$ includes, for example, an alkyl group such as methyl, ethyl, propyl, isopropyl, butyl, isobutyl, hexyl and octyl groups, etc.; a cyclohexyl group; an alkenyl group such as allyl, propenyl and butenyl groups, etc.; an aryl group such as phenyl, tolyl and xylyl groups, etc.; an aralkyl group such as phenethyl and 3-phenylpropyl groups, etc. Of those, especially preferred is an alkyl group having from 1 to 10 carbon atoms.

Another example of producing the magnesium compounds comprises contacting a magnesiumalkoxy compound of $Mg(OR^{11})_2$ (where $R^{11}$ represents a hydrocarbon residue having from 1 to 20 carbon atoms) with a halide.

The halide includes, for example, silicon tetrachloride, silicon tetrabromide, tin tetrachloride, tin tetrabromide, hydrogen chloride, etc. Of those, preferred is silicon tetrachloride. $R^{11}$ includes, for example, an alkyl group such as methyl, ethyl, propyl, isopropyl, butyl, isobutyl, hexyl and octyl groups, etc.; a cyclohexyl group; an alkenyl group such as allyl, propenyl and butenyl groups, etc.; an aryl group such as phenyl, tolyl and xylyl groups, etc.; an aralkyl group such as phenethyl and 3-phenylpropyl groups, etc. Of those, especially preferred is an alkyl group having from 1 to 10 carbon atoms.

The Mg compounds may be used either singly or as carried on a support such as silica, alumina, polystyrene or the like. Two or more of the compounds may be used in combination. The compounds may be used along with halogens or the like in mixture.

(c) Electron Donor:

The electron donor for use in the invention is a compound of the following general formula (I):

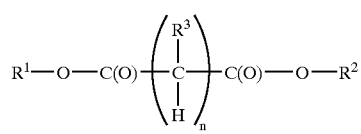

wherein $R^1$ and $R^2$ each represent a linear or branched hydrocarbon residue having from 1 to 20 carbon atoms, and these may be the same or different ones; $R^3$ represents an alicyclic hydrocarbon residue having from 3 to 20 carbon atoms; and n represents an integer of from 1 to 10.

Specific examples of $R^1$ and $R^2$ include methyl, ethyl, n-propyl, i-propyl, n-butyl, i-butyl, t-butyl, n-pentyl, i-pentyl, n-hexyl, n-octyl and 2-ethylhexyl groups, etc.

Specific examples of $R^3$ include cyclopropyl, cyclobutyl, cyclopentyl, cyclohexyl, cycloheptyl, cyclooctyl and cyclododecyl groups, and their alkyl-substituted groups, etc. Preferred are a cyclopentyl group and its $C_{1-8}$ alkyl-substituted groups; and especially preferred is a cyclopentyl group.

Specific examples of the compound noted above include dimethyl cyclopentylmalonate, diethyl cyclopentylmalonate, di-n-propyl cyclopentylmalonate, di-i-propyl cyclopentylmalonate, di-n-butyl cyclopentylmalonate, di-i-butyl cyclopentylmalonate, di-t-butyl cyclopentylmalonate, di-n-pentyl cyclopentylmalonate, di-i-pentyl cyclopentylmalonate, dineopentyl cyclopentylmalonate, di-n-hexyl cyclopentylmalonate, di-n-heptyl cyclopentylmalonate, di-n-octyl cyclopentylmalonate, di (2-ethylhexyl) cyclopentylmalonate, etc. Of those, especially preferred are diethyl cyclopentylmalonate and di-n-butyl cyclopentylmalonate. These compounds may be used either singly or as combined.

The malonates noted above may be prepared in any known method, for example, through malonate synthesis in the same manner as in the method described in "Lecture on Experimental Chemistry, 4th ed., Vol. 22, page 59, published by Maruzen", or through transesterification in the same manner as in the method described in "New Edition of Lecture on Experimental Chemistry, Vol. 14-II, pages 931 and 1003, published by Maruzen".

(d) Silicon Compound:

In preparing the solid catalyst component of the invention, optionally used is an additional ingredient (d) of a silicon compound of the following general formula (V), in addition to the ingredients (a), (b) and (c) noted above.

In formula (V), $X^3$ represents a halogen atom, and is preferably a chlorine or bromine atom, more preferably a chlorine atom. $R^{12}$ represents a hydrocarbon residue, which may be saturated or unsaturated, and may be linear, branched or cyclic. This may have hetero atoms such as sulfur, nitrogen, oxygen, silicon, phosphorus and the like. Preferably, however, $R^{12}$ is a hydrocarbon residue having from 1 to 10 carbon atoms, more preferably an alkyl, alkenyl, cycloalkyl, cycloalkenyl, aryl or aralkyl group. A plurality of $(R^{12})$'s, if any, may be the same or different ones. Specific examples of $R^{12}$ include a methyl group, an ethyl group, an n-propyl group, an isopropyl group, an n-butyl group, a sec-butyl group, an isobutyl group, a pentyl group, a hexyl group, a heptyl group, an octyl group, a decyl group, an allyl group, a butenyl group, a cyclopentyl group, a cyclohexyl group, a cyclohexenyl group, a phenyl group, a tolyl group, a benzyl group, a phenethyl group, etc. q represents an integer of from 0 to 3.

Specific examples of the silicon compound of formula (V) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane, tripropoxychlorosilane, etc. Of those, especially preferred is silicon tetrachloride. These silicon compounds may be used either singly or as combined.

The optional ingredient (d), silicon compound may be used in a molar ratio, silicon compound/magnesium compound of generally not smaller than 0.01, preferably not smaller than 0.10. If the molar ratio is smaller than 0.01, the compound could not satisfactorily exhibit its ability to improve the catalytic activity of the catalyst, and its ability to improve the stereospecificity of the polymers to be produced. If so, in addition, the fine powder content of the polymers produced will increase.

(B) Organic Aluminium Compound:

The organic aluminium compound (B) for use in the invention includes those having any of alkyl groups, halogen atoms, hydrogen atoms and alkoxy groups, as well as aluminoxanes and their mixtures. Concretely mentioned are trialkylaluminiums such as trimethylaluminium, triethylaluminium, triisopropylaluminium, triisobutylaluminium, trioctylaluminium, etc.; dialkylaluminium monochlorides such as diethylaluminium monochloride, diisopropylaluminium monochloride, diisobutylaluminium monochloride, dioctylaluminium monochloride, etc.; alkylaluminium sesqui-halides such as ethylaluminium sesqui-chloride, etc.; linear aluminoxanes such as methylaluminoxane, etc. Of those organic aluminium compounds, preferred are trialkylaluminiums having $C_{1-5}$ lower alkyl groups, and especially preferred are trimethylaluminium, triethylaluminium, triisopropylaluminium and triisobutylaluminium. The organic aluminium compounds may be used either singly or as combined.

The component (B), organic aluminium compound may be used in an atomic ratio, aluminium/titanium of falling generally between 1 and 1000, preferably between 10 and 500. If the atomic ratio oversteps the defined range, the catalytic activity of the catalyst will be poor.

(C) Third Component (Electron Donor Compound):

In preparing the catalyst for olefin polymerization of the invention, optionally used is a third component (C), electron donor compound. The electron donor compound (C) includes alkoxy-having organic silicon compounds, nitrogen-containing compounds, phosphorus-containing compounds, and oxygen-containing compounds. Of those, especially preferred are alkoxy-having organic silicon compounds.

Specific examples of the alkoxy-having organic silicon compounds include tetramethoxysilane, tetraethoxysilane, tetrabutoxysilane, tetraisobutoxysilane, trimethylmethoxysilane, trimethylethoxysilane, triethylethoxysilane, triethylethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl) dimethoxysilane, t-butylamyldimethoxysilane, t-butylhexyldimethoxysilane, t-butylheptyldimethoxysilane, t-butyloctyldimethoxysilane, t-butylnonyldimethoxysilane, t-butyldecyldimethoxysilane, t-butyl(3,3,3-trifluoromethylpropyl)dimethoxysilane, cyclopentyl-t-butyldimethoxysilane, cyclohexyl-t-butyldimethoxysilane, dicyclopentyldimethoxysilane, bis(2-methylcyclopentyl) dimethoxysilane, bis(2,3-dimethylcyclopentyl) dimethoxysilane, diphenyldimethoxysilane, phenyltriethoxysilane, methyltrimethoxysilane, ethyltrimethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornanetrimethoxysilane, indenyltrimethoxysilane, 2-methylcyclopentyltrimethoxysilane, cyclopentyl(t-butoxy)dimethoxysilane, isopropyl(t-butoxy) dimethoxysilane, t-butyl(isobutoxy)dimethoxysilane, t-butyl(t-butoxy)dimethoxysilane, thexyltrimethoxysilane, thexylisopropoxydimethoxysilane, thexyl(t-butoxy) dimethoxysilane, thexylmethyldimethoxysilane, thexylethyldimethoxysilane, thexylisopropyldimethoxysilane, thexylcyclopentyldimethoxysilane, thexylmyristyldimethoxysilane, thexylcyclohexyldimethoxysilane, cyclohexylmethyldimethoxysilane, etc. These organic silicon compounds may be used either singly or as combined.

Specific examples of the nitrogen-containing compounds include 2,6-substituted piperidines such as 2,6-diisopropylpiperidine, 2,6-diisopropyl-4-methylpiperidine, N-methyl-2,2,6,6-tetramethylpiperidine, etc.; 2,5-substituted azolidines such as 2,5-diisopropylazolidine, N-methyl-2,2,5,5-tetramethylazolidine, etc.; substituted methylenediamines such as N,N,N'N'-tetramethylmethylenediamine, N,N,N',N'-tetraethylmethylenediamine, etc.; substituted imidazolidines such as 1, 3-dibenzylimidazolidine, 1,3-dibenzyl-2-phenylimidazolidine, etc.

Specific examples of the phosphorus-containing compounds include phosphites such as triethyl phosphite, tri-n-propyl phosphite, triisopropyl phosphite, tri-n-butyl phosphite, triisobutyl phosphate, diethyl-n-butyl phosphate, diethylphenyl phosphite, etc.

Specific examples of the oxygen-containing compounds include 2,6-substituted tetrahydrofurans such as 2,2,6,6-tetramethyltetrahydrofuran, 2,2,6,6-tetraethyltetrahydrofuran, etc.; dimethoxymethane derivatives such as 1,1-dimethoxy-2,3,4,5-tetrachlorocyclopentadiene, 9,9-dimethoxyfluorene, diphenyldimethoxymethane, etc.

The component (C), electron donor compound may be used in a ratio, electron donor compound (C)/organic aluminium compound (B) of falling generally between 0.001 and 5.0, preferably between 0.01 and 1.0. If the molar ratio oversteps the defined range, the catalytic activity of the catalyst will be poor.

[II] Preparation of Solid Catalyst Component

The solid catalyst component (A) noted above may be prepared by bringing the titanium compound (a), the magnesium compound (b), the electron donor (c) and optionally the silicon compound (d) into contact with each other in any known method.

Known methods for the preparation are, for example, in JP-A Sho-53-43094, Sho-55-135102, Sho-55-135103, and Sho-56-18606.

For example, the component (A) may be prepared according to (1) a method comprising grinding a magnesium compound or a complex of a magnesium compound and an electron donor, in the presence of an electron donor and optionally a grinding promoter, followed by reacting the resulting powdery mixture with a titanium compound; (2) a method comprising reacting a non-reducible, liquid magnesium compound with a liquid titanium compound in the presence of an electron donor to form a solid titanium composite; (3) a method comprising reacting the product as obtained in (1) or (2) with a titanium compound; (4) a method comprising reacting the product as obtained in (1) or (2) with an electron donor and a titanium compound; (5) a method comprising grinding a magnesium compound or a complex of a magnesium compound and an electron donor, in the presence of an electron donor, a titanium compound and optionally a grinding promoter, followed by processing the resulting powdery mixture with a halogen or a halide.

Apart from the methods noted above, any others such as those described in JP-A Sho-56-166205, Sho-57-63309, Sho-57-190004, Sho-57-300407 and Sho-58-47003 may also be employed for preparing the solid catalyst component (A).

In addition, the solid catalyst component may also be prepared by contacting a solid of a magnesium compound such as that mentioned above, as carried on an oxide of an element of Groups II to IV of the Periodic Table, such as silicon oxide, magnesium oxide or the like, or on a composite oxide containing at least one oxide of an element of Group II to IV of the Periodic Table, such as silica-alumina or the like, with an electron donor and a titanium compound, in a solvent at a temperature falling between 0 and 200° C., preferably between 10 and 150° C., for 2 minutes to 24 hours.

The amount of the titanium compound to be used may be generally from 0.5 to 100 mols, preferably from 1 to 50 mols, relative to 1 mol of magnesium of the magnesium compound. The amount of the electron donor to be used may be generally from 0.01 to 10 mols, preferably from 0.05 to 1.0 mol, relative to 1 mol of magnesium of the magnesium compound. If desired, a halide of silicon tetrachloride maybe added to those compounds.

The temperature for the contact may generally fall between −20 and 200° C., preferably between 20 and 150° C.; and the time for the contact may generally fall between 1 minute and 24 hours, preferably between 10 minutes and 6 hours. The procedure for the contact is not specifically defined. For example, the constituent ingredients may be contacted with each other in an inert solvent such as a hydrocarbon solvent; or the ingredients may be separately diluted with an inert solvent such as a hydrocarbon solvent and then contacted with each other. The inert solvent includes, for example, aliphatic hydrocarbons such as n-pentane, isopentane, n-hexane, n-heptane, n-octane, iso-octane, etc.; aromatic hydrocarbons such as benzene, toluene, xylene, etc.; and their mixtures.

The contact with the titanium compound may be repeated twice or more, whereby the compound may be sufficiently carried on the magnesium compound acting as a catalyst carrier.

The solid catalyst component having been produced as a result of the contact noted above may be washed with an inert solvent such as a hydrocarbon solvent. The solvent may be the same as that mentioned above. The resulting solid product may be stored in dry, or in an inert solvent such as a hydrocarbon solvent.

[III] Polymerization

Regarding its amount to be used in the invention, the component solid catalyst component (A) may be used in an amount of generally from 0.0005 to 1 mmol, in terms of the titanium atom content thereof, relative to one liter of the reaction system.

As olefins for use in the invention, preferred are α-olefins of a general formula (VI):

In formula (VI), $R^{13}$ represents a hydrogen atom or a hydrocarbon residue. The hydrocarbon residue may be saturated or unsaturated, and may be linear, branched or cyclic. The olefins concretely include ethylene, propylene, 1-butene, 1-pentene, 1-hexene, 1-heptene, 1-octene, 1-decene, 3-methyl-1-pentene, 4-methyl-1-pentene, vinylcyclohexane, etc. One or more olefins may be used either singly or as combined.

Of the olefins noted above, especially preferred are ethylene and propylene. Also employable herein are dienes such as butadiene, etc.; and other various olefins.

Olefin polymerization in the invention may comprise pre-polymerization of olefins followed by final polymerization thereof. In this case, for example, olefins may be pre-polymerized in the presence of a catalyst as prepared by mixing the solid catalyst component (A), the organic aluminium compound (B) and the electron donor compound (C) in a predetermined ratio, generally at a temperature falling between 1 and 100° C., under normal pressure or an increased pressure of 50 kg/cm$^2$G or so, and thereafter olefins are finally polymerized in the presence of the catalyst and the prepolymer formed in the pre-polymerization. The mode of final polymerization is not specifically defined, and may be any of solution polymerization, slurry polymerization, vapor-phase polymerization, bulk polymerization and the like. Any of batch polymerization and continuous polymerization may apply to the polymerization mode, and two-stage or multi-stage polymerization also may apply thereto.

Regarding the reaction condition, the polymerization pressure is not specifically defined and may fall generally between atmospheric pressure and 80 kg/cm$^2$G, but preferably between 2 and 50 kg/cm$^2$G; and the polymerization temperature may fall generally between 0 and 200° C., but preferably between 30 and 100° C. The polymerization time varies, depending on the type of the starting olefins and the polymerization temperature, and therefore could not be indiscriminately defined. In general, however, the polymerization time may fall between 5 minutes and 20 hours, preferably between 10 minutes and 10 hours or so.

The molecular weight of the polymers to be produced in the invention may be controlled by adding a chain transfer agent, preferably hydrogen to the reaction system. If desired, the polymerization may be effected in the presence of an inert gas such as nitrogen or the like.

Regarding the catalyst components for use in the invention, the components (A), (B) and (C) may be previously mixed in a predetermined ratio and contacted with each other, and, immediately after the preparation of the catalyst in that manner, olefins may be polymerized in the presence of the catalyst; or after the catalyst thus prepared is aged for 0.2 to 3 hours or so, olefins may be polymerized in the presence of it. The catalyst components may be used after having been suspended in an inert solvent or olefin.

In the invention, the post-treatment after polymerization may be effected in any ordinary manner. For example, the powdery polymer as produced in vapor-phase polymerization is taken out of the polymerization reactor, and a nitrogen stream may be introduced thereinto so as to remove non-reacted olefins from the polymer. If desired, the polymer may be pelletized through an extruder. In this case, a small amount of water, alcohol or the like may be added to the polymer so as to completely inactivate the catalyst. The polymer as produced in bulk polymerization is taken out of the polymerization reactor, non-reacted monomers are completely removed from it, and the resulting polymer may be pelletized.

The invention is described concretely with reference to the following Examples, which, however, are not intended to restrict the scope of the invention. The intrinsic viscosity [η] and the stereospecificity [mmmm] of the polymers produced are obtained in the manner mentioned below. Intrinsic viscosity [η]:

A polymer sample was dissolved in decalin, and its intrinsic viscosity was measured at 135° C.

Stereospecificity [mmmm]:

A polymer sample was dissolved in 1,2,4-trichlorobenzene, and subjected to a proton complete decoupling method for $^{13}$C-NMR (using JEOL Ltd's EX-400) at 130° C. Based on the signals for the methyl group obtained in the method, the stereospecificity [mmmm] of the sample was determined.

The stereospecificity (isotactic pentad fraction) [mmmm] as referred to herein was proposed by A. Zambelli, et al., in "Macromolecules, 6, 925 (1973)", and it indicates the isotactic fraction in the pentad unit of a polypropylene molecular chain as measured in $^{13}$C nuclear magnetic resonance spectrometry. For the attribution of the peaks seen in the $^{13}$C nuclear magnetic resonance spectrometry, referred to was the A. Zambelli et al's proposal in "Macromolecules, 8, 687 (1975)".

Production Example
Production of Di-n-butyl cyclopentylmalonate:

A 0.5-liter three-neck flask equipped with a stirrer was purged with nitrogen gas, and 7.2 g (0.3 mols) of sodium hydride and 250 ml of dewatered tetrahydrofuran were put thereinto in a nitrogen stream atmosphere. With stirring, the mixture was cooled to 0° C., and, while its temperature was kept cooled, 66 ml (0.3 mols) of di-n-butyl malonate was dropwise added thereto over a period of 30 minutes. After the addition, the mixture was heated up to room temperature, and 32 ml of cyclopentyl bromide was dropwise added thereto, and refluxed for 5 hours. After this was cooled to room temperature, 10 g of sodium hydride and 32 ml of cyclopentyl bromide were added thereto, and refluxed further for 8 hours. The resulting reaction mixture was washed with 200 ml of water, and subjected to distillation under reduced pressure to obtain 20 g of di-n-butyl cyclopentylmalonate. The yield was 23.5%.

EXAMPLE 1

(1) Preparation of Solid Catalyst Component

A 0.5-liter three-neck flask equipped with a stirrer was purged with nitrogen gas, and 60 ml of dewatered heptane and 4.0 g (35 mmols) of diethoxymagnesium were put thereinto. After the mixture was heated at 4° C. for 20 minutes, 1.24 ml (4.4 mmols) of di-n-butyl cyclopentylmalonate was added thereto. The resulting solution was further heated up to 90° C., and 116 ml (1.04 mols) of titanium tetrachloride was added thereto, and stirred at an inner temperature of 110° C. for 2 hours, whereby the catalyst ingredient was carried on the carrier. Next, this was fully washed with dewatered heptane. Then, 116 ml (1.04 mols) of titanium tetrachloride was added to this, and stirred at an inner temperature of 110° C. for 2 hours. This is the second operation for carrying the catalyst ingredient on the carrier. After having been well washed with dewatered heptane, obtained was a solid catalyst component in which the amount of titanium. carried on the carrier was 2.08% by weight.

(2) Propylene Slurry Polymerization

A one-liter stainless autoclave equipped with a stirrer was fully dried and purged with nitrogen, and 400 ml of dewatered heptane was put thereinto at room temperature. 2.0 mmols of triethylaluminium, 0.25 mmols of dicyclopentyldimethoxysilane, and 0.005 mmols, in terms of Ti atom, of the solid catalyst component having been prepared previously were added thereto, and hydrogen was introduced thereinto to have a pressure of 1 kg/cm$^2$G. Next, propylene was introduced into the autoclave to have an elevated temperature of 80° C. and an increased total pressure of 8 kg/cm$^2$G, and was polymerized therein for 60 minutes. Next, the autoclave was cooled and degassed, and the content was taken out of it, and put into 2 liters of methanol with which the catalyst was inactivated. This was then filtered and dried in vacuum to obtain 98 g of a propylene polymer. The catalyst activity was 409 kg-PP/g-Ti. The polymer had [η] of 1.07 dl/g and a degree of stereospecificity [mmmm] of 96.8%.

EXAMPLE 2

In the same manner as in Example 1 except that the amount of di-n-butyl cyclopentylmalonate used in preparing the solid catalyst component was varied to 0.9 ml (3.2 mmols), a catalyst was prepared, and propylene was polymerized in the presence of the catalyst prepared herein. The amount of Ti carried on the carrier in the solid catalyst component was 1.8% by weight. The yield of the polymer produced was 141.6 g. The catalyst activity was 591 kg-PP/g-Ti. The polymer had [η] of 1.20 dl/g and a degree of stereospecificity [mmmm] of 96.7%.

EXAMPLE 3

In the same manner as in Example 2 except that diethyl cyclopentylmalonate was used in place of di-n-butyl cyclopentylmalonate, a catalyst was prepared, and propylene was polymerized in the presence of the catalyst prepared herein. The amount of Ti carried on the carrier in the solid catalyst component was 1.29% by weight. The yield of the polymer produced was 78.6 g. The catalyst activity was 324 kg-PP/g-Ti. The polymer had [η] of 1.13 dl/g and a degree of stereospecificity [mmmm] of 97.0%.

COMPARATIVE EXAMPLE 1

In the same manner as in Example 2 except that diethyl diethylmalonate was used in place of di-n-butyl cyclopentylmalonate, a catalyst was prepared, and propylene was polymerized in the presence of the catalyst prepared herein. The yield of the polymer produced was 64.8 g. The catalyst activity was 271 kg-PP/g-Ti. The polymer had [η] of 1.04 dl/g and a degree of stereospecificity [mmmm] of 96.0%.

COMPARATIVE EXAMPLE 2

In the same manner as in Example 3 except that di-n-butyl malonate was used in place of diethyl cyclopentylmalonate, a catalyst was prepared, and propylene was polymerized in the presence of the catalyst prepared herein. The amount of Ti carried on the carrier in the solid catalyst component was 1.2% by weight. The yield of the polymer produced was 1.8 g. The catalyst activity was 7 kg-PP/g-Ti. The polymer had [η] of 1.08 dl/g and a degree of stereospecificity [mmmm] of 93.1%.

COMPARATIVE EXAMPLE 3

In the same manner as in Example 3 except that diethyl diisobutylmalonate was used in place of diethyl cyclopentylmalonate, a catalyst was prepared, and propylene was polymerized in the presence of the catalyst prepared herein. The amount of Ti carried on the carrier in the solid catalyst component was 2.8% by weight. The yield of the polymer produced was 68.3 g. The catalyst activity was 297 kg-PP/g-Ti. The polymer had [η] of 1.09 dl/g and a degree of stereospecificity [mmmm] of 95.9%.

As described in detail hereinabove, the present invention provides a solid catalyst component for olefin polymerization and a catalyst comprising the component for olefin polymerization, in which the electron donor is free from the problem of lacking in safety and sanitation, and is inexpensive and easy to produce, and which exhibit high activity in producing olefin polymers with high stereospecificity, and also a method for producing olefin polymers in the presence of the catalyst.

While the invention has been described in detail and with reference to specific embodiments thereof, it will be apparent to one skilled in the art that various changes and modifications can be made therein without departing from the spirit and scope thereof.

What is claimed is:
1. A method for producing olefin polymers, which comprises polymerizing olefins in the presence of a catalyst for olefin polymerization, the catalyst comprising (A) a solid catalyst component for olefin polymerization and (B) an organic aluminum compound, wherein said solid catalyst component for olefin polymerization comprises titanium, magnesium, and a compound of a general formula(I):

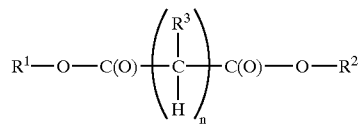
(I)

wherein $R^1$ and $R^2$ each represent a linear or branched hydrocarbon residue having from 1 to 20 carbon atoms, and these may be the same or different ones; $R^3$ represents an alicyclic hydrocarbon residue having from 3 to 20 carbon atoms; and n is 1.

2. The method of claim 1, wherein said catalyst comprises (A) the solid catalyst component for olefin polymerization, (B) the organic aluminum compound, and (C) a third component of an electron donor compound.

3. The method of claim 2, wherein the third component of an electron donor compound (C) is an organic silicon compound.

* * * * *